United States Patent
Aune et al.

(10) Patent No.: US 11,544,413 B2
(45) Date of Patent: Jan. 3, 2023

(54) CRYPTOGRAPHIC KEY DISTRIBUTION

(71) Applicant: Nordic Semiconductor ASA, Trondheim (NO)

(72) Inventors: Frank Aune, Trondheim (NO); Jean-Baptiste Brelot, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/051,760

(22) PCT Filed: May 2, 2019

(86) PCT No.: PCT/EP2019/061265
§ 371 (c)(1),
(2) Date: Oct. 29, 2020

(87) PCT Pub. No.: WO2019/211385
PCT Pub. Date: Nov. 7, 2019

(65) Prior Publication Data
US 2021/0240870 A1   Aug. 5, 2021

(30) Foreign Application Priority Data

May 2, 2018   (GB) .................................... 1807257

(51) Int. Cl.
*G06F 21/79*   (2013.01)
*G06F 21/60*   (2013.01)
(Continued)

(52) U.S. Cl.
CPC ............ *G06F 21/79* (2013.01); *G06F 21/602* (2013.01); *G06F 21/72* (2013.01); *G06F 21/74* (2013.01);
(Continued)

(58) Field of Classification Search
CPC ........ G06F 21/79; G06F 21/602; G06F 21/72; G06F 21/74; G06F 21/85; G06F 2221/0751
See application file for complete search history.

(56) References Cited

U.S. PATENT DOCUMENTS 9,286,241 B2 * 3/2016 Simmons .............. H04L 9/0822
10,592,527 B1 * 3/2020 Jia ........................... G06F 16/27
(Continued)

FOREIGN PATENT DOCUMENTS

EP   1 826 694 A2   8/2007
EP   2 637 124 A2   9/2013
(Continued)

OTHER PUBLICATIONS

ARM TrustZone CryptoCell-312: Simplifying the design of secure IoT systems, https://community.arm.com/iot/embedded/b/embedded-blog/posts/arm-trustzone-cryptocell-312-simplifying-the-design-of-secure-iot-systems, downloaded on Aug. 6, 2017, 7 pages.
(Continued)

*Primary Examiner* — Jung W Kim
*Assistant Examiner* — Alan Lingqian Kong
(74) *Attorney, Agent, or Firm* — Klarquist Sparkman, LLP (57) ABSTRACT

An integrated-circuit device comprises a processor, a hardware key-storage system, and a key bus. The hardware key-storage system comprises a non-volatile key storage memory, which includes a key register, for storing a cryptographic key, and an address register, for storing a destination memory address for the cryptographic key. The hardware key-storage system further comprises output logic for sending the cryptographic key over the key bus to the destination memory address, and write-once logic for pre-
(Continued)

venting an address being written to the address register unless the address register is in an erased state.

14 Claims, 3 Drawing Sheets

(51) Int. Cl.
    *G06F 21/72*     (2013.01)
    *G06F 21/74*     (2013.01)
    *G06F 21/85*     (2013.01)

(52) U.S. Cl.
    CPC ...... *G06F 21/85* (2013.01); *G06F 2221/0751* (2013.01)

(56) References Cited

U.S. PATENT DOCUMENTS

| | | | |
|---|---|---|---|
| 2005/0177741 A1* | 8/2005 | Chen | H04N 21/2541 713/189 |
| 2006/0015748 A1* | 1/2006 | Goto | G06F 21/554 713/190 |
| 2008/0313471 A1 | 12/2008 | Huang et al. | |
| 2013/0219189 A1 | 8/2013 | Simmons | |
| 2013/0238907 A1* | 9/2013 | Debout | G06F 12/0246 713/193 |
| 2014/0195807 A1 | 7/2014 | Bar-El et al. | |
| 2015/0254017 A1* | 9/2015 | Soja | G06F 3/0622 711/103 |
| 2016/0154744 A1* | 6/2016 | Zheng | H04N 21/4435 713/193 |

FOREIGN PATENT DOCUMENTS

| | | |
|---|---|---|
| GB | 2 503470 A | 1/2014 |
| WO | WO 2006/131921 A2 | 12/2006 |
| WO | WO 2013/088121 A1 | 6/2013 |

OTHER PUBLICATIONS

ARM TrustZone Technology, Overview, https://developer.arm.com/technologies/trustzone, downloaded on Aug. 6, 2017, 8 pages.

Gaspar et al., "Cryptographic Extension for Soft General-Purpose Processors with Secure Key Management," *IEEE 2011 International Conference on Field Programmable Logic and Applications(FPL)*, Sep. 5, 2011, pp. 500-505.

Gaspar et al., "Secure extension of FPGA soft core processors for symmetric key cryptography," *6th International Workshop on Reconfigurable Communication-centric Systems-on-Chip, ReCoSoC 2011*, Jun. 2011, 9 pages.

International Search Report and Written Opinion for PCT/EP2019/061265, dated Aug. 8, 2019, 15 pages.

IPO Search Report under Section 17(5) for GB1807257.9, dated Nov. 16, 2018, 3 pages.

\* cited by examiner

CRYPTOGRAPHIC KEY DISTRIBUTION

CROSS REFERENCE TO RELATED APPLICATIONS

This is the U.S. National Stage of International Application No. PCT/EP2019/061265, filed May 2, 2019, which was published in English under PCT Article 21(2), which in turn claims the benefit of Great Britain Application No. 1807257.9, filed May 2, 2018.

BACKGROUND OF THE INVENTION

This invention relates to apparatus and methods for protecting cryptographic key data within an integrated-circuit device.

Cryptographic techniques such as encryption, digital signature generation, message authentication, etc., typically rely on the secrecy of a secret key (symmetric cryptography) or a private key (asymmetric cryptography) in order to be effective. If the cryptographic key becomes known to an attacker, or known publicly, the security of the cryptographic process is typically compromised.

It is therefore important that embedded devices, such as integrated-circuit devices, store and handle cryptographic keys securely.

Arm™ TrustZone provides compatible Arm™ microcontrollers with two operating states: Secure and Non-secure. Hardware logic in the bus fabric ensures that no secure world resources can be accessed by non-secure world components, thereby providing a security perimeter around selected sensitive resources. Components that are critical to the security of the system can be placed in the secure world. Such critical components may include: a secure boot loader, secret keys, flash programming support, and high value assets. The remaining applications are placed in the normal, non-secure world. Non-secure (non-trusted) software applications cannot access secure (trusted) resources directly, but must request access through APIs provided by secure software. These APIs can implement authentication checks to decide if whether to permit access to a secure service. This approach makes it harder for attackers, who may have compromised part of the non-secure software code, to access cryptographic keys on such a device.

It is also known to implement certain cryptographic operations, such as an encryption algorithm, as a hardware peripheral on an integrated-circuit device, thus forming a cryptographic acceleration engine. This can provide performance advantages compared with a processor performing the operation in software. It can also provide some increased security by physically separating the cryptographic operation from the processor. However, cryptographic key data will typically still need to be loaded into the hardware cryptographic engine. If this is done by the processor, there is a risk of the key data being compromised, even if this is done in a secure mode of operation.

"Cryptographic Extension for Soft General-Purpose Processors with Secure Key Management" by Gaspar et al., International Conference on Field Programmable Logic and Applications, 2011. FPL 2011., September 2011, Chania, Crete, Greece. pp. 500-505, proposes storing cryptographic keys in a key zone that is architecturally and physically separated from a processor on a chip. The keys are transferred between the key memory and a cipher block via a key bus, which is separate from a data bus that connects the processor with the cipher block. Before enciphering/deciphering data blocks, the cipher is initialised with a selected key. Key selection is controlled by the processor through a control bus.

Such an approach provides increased security for the cryptographic keys. However, it lacks flexibility.

The present invention seeks to provide a novel approach to storing cryptographic keys on an integrated-circuit device that is both secure and flexible.

SUMMARY OF THE INVENTION

From a first aspect, the invention provides an integrated-circuit device comprising:
  a processor;
  a hardware key-storage system; and
  a key bus,
  wherein the hardware key-storage system comprises:
  a non-volatile key storage memory comprising a key register for storing a cryptographic key and an address register for storing a destination memory address for the cryptographic key;
  output logic for sending the cryptographic key over the key bus to the destination memory address; and
  write-once logic for preventing an address being written to the address register unless the address register is in an erased state.

From a second aspect, the invention provides a method of operating an integrated-circuit device, the integrated-circuit device comprising:
  a processor;
  a hardware key-storage system; and
  a key bus,
  wherein the hardware key-storage system comprises a non-volatile key storage memory comprising a key register that stores a cryptographic key and an address register that stores a destination memory address for the cryptographic key, the method comprising the hardware key-storage system:
  receiving an instruction to write a new destination memory address to the address register;
  determining that the address register in not in an erased state; and
  in response to said determining, preventing the writing of the new destination memory address to the address register.

The method may further comprise sending the cryptographic key over the key bus to the destination memory address.

Thus it will be seen that, in accordance with the invention, the key-storage system supports the setting of a destination address for the cryptographic key, with hardware logic preventing modification of the destination address after it has been set. This provides the device manufacturer or distributer with the flexibility to decide what key to load, and where on the chip the key should be used, while providing no opportunity for an attacker to direct the key to a different destination by modifying the destination address after it has been set.

This approach contrasts with hardwiring a key register to a cipher block, such that the key can only be used with that cipher, which requires decisions about cryptographic key storage requirements to be fixed at the hardware design stage.

The additional flexibility provided by configurable destination memory addresses may be particularly appreciated when, in a preferred set of embodiments, the device comprises a plurality of key registers (or key slots) for storing a plurality of respective cryptographic keys. Each key is preferably associated with a respective address register, for storing a respective destination memory address for the key. The output logic is preferably configured for sending each cryptographic key over the key bus to a respective destination memory address, stored in the respective address register. In this way, a manufacturer, distributor or user of the integrated-circuit device can decide precisely how many keys to store for any particular destination address on the device, without this being predetermined by the physical design of the integrated-circuit device.

The integrated-circuit device may comprise one or more cryptographic engines (sometimes called cryptographic coprocessors or cryptographic accelerators) connected to the key bus. In one set of embodiments, it comprises a plurality of cryptographic engines, connected to the key bus—e.g., an Arm™ CryptoCell security module and a proprietary cryptographic engine developed by the device manufacturer. Each cryptographic engine may have a respective register input, having a respective memory-mapped address, for receiving a cryptographic key over the key bus. The device preferably comprises hardware for performing at least two different cryptographic algorithms, each algorithm having a different respective register address for receiving a cryptographic key from the key-storage system.

The output logic is preferably configured for sending a cryptographic key only to the respective destination memory address stored in the address register (i.e., not to any other destination address). In some embodiments, however, one cryptographic key may be associated with a plurality of address registers, for storing a plurality of destination addresses for the cryptographic key, and the output logic may be configured for sending the cryptographic key over the key bus to any of the plurality of destination addresses—but preferably not to any destination outside the plurality of destination addresses.

The processor is preferably not connected to the key bus. Instead, the device may comprise a system bus to which the processor is connected. The system bus may comprise any one or more of: data buses, address buses, peripheral buses, etc. The device may also comprise volatile and/or non-volatile memory connected to the system bus. The key-storage system may be connected to the system bus. Any number of other peripherals may be connected to the system bus. The device preferably supports memory-mapped peripheral communication over the system bus. The processor (and potentially other peripherals) may be able to send instructions to the key-storage system over the system bus.

The hardware key-storage system may have a cryptographic key stored in the key register, and a destination memory address stored in the key register. The key and address may be written to the registers during manufacturing, or they may be loaded by software stored in a memory of the device and executed by the processor—e.g., a secure bootloader, or other trusted code. The destination memory address is preferably an address of a memory location that is never readable by the processor, or that is readable by the processor only when the processor is in a secure mode (e.g., an Arm™ TrustZone™ secure mode). The destination memory address may be for a memory location that is not readable over the system bus, or that is only readable over the system bus when the processor is in a secure mode. These restrictions are preferably enforced by hardware—e.g., by a bus controller, a memory management unit, or a memory protection unit. In this way, the key value can be physically protected from being read by software executing on the processor, thereby providing strong protection against any attempts by an attacker to discover the value of the cryptographic key that is stored in the key register. In some embodiments, the memory location may be physically unreadable even over the key bus (although it should be writable over the key bus, so that the key-storage system can push the key to the destination address).

The hardware key-storage system may comprise a key storage memory and/or a key management unit.

The key storage memory may comprise the key register (or registers), for storing the actual key (or keys), and the address register (or registers), for storing the destination address (or addresses). It may also comprise one or more configuration registers for storing configuration data relating to each cryptographic key, such as access permissions or a revocation flag. The address register, configuration register and key register for a particular cryptographic key may occupy successive memory address ranges in the non-volatile key storage memory. They may together constitute a key slot. Each key slot may have a fixed size—e.g., consisting of 128 bits of key register plus a fixed number of additional bits of address register and any configuration data. Alternatively, one or more of the key slots may be variable in size. If the key slots are of fixed size, note that it can still be possible to store a longer key on the device, by splitting the key across two or more key slots. The key storage memory may be part of a larger non-volatile memory region, or may be physically separate from other system memory.

The hardware key-storage system preferably comprises read-access logic for controlling read access to the key register(s), or key storage memory. The read-access logic may be configured to prevent the processor from reading any data from the key register(s), or key storage memory. In some embodiments, the processor has a secure mode and a non-secure mode. If the processor is an Arm™ processor, these may be TrustZone states. The read-access logic may be configured to prevent the processor from reading data from the key register(s) or key storage memory when the processor in a non-secure mode. However, it may permit at least some read access to the key register(s) or key storage memory, over the system bus, when the processor is in a secure mode. The key storage memory may comprise a configuration register, associated with each key register, for storing a flag that determines whether secure-mode read access of the respective key register is permitted. Allowing the processor access to certain key data may be useful during a trusted boot process, or for performing cryptographic operations for which the device has no available hardware acceleration.

The key management unit may comprise the output logic and/or the write-once logic and/or the read-access logic. It may be part of a non-volatile memory controller for the device. The key storage memory is preferably accessible only through the key management unit—i.e., the key management unit is arranged to intercept all read or write messages on the system bus that address the key storage memory, or to intercept all write transactions that address the address register(s) and/or to intercept all read transactions that address the key register(s).

The output logic may be a bus master for the key bus. It may write the key to the destination memory address using direct memory access (DMA).

The write-once logic may comprise circuitry for reading part or all of the address register and for determining whether said part or all of the address register is in an erased (i.e. cleared) state. Where the non-volatile key storage memory is flash memory, for example, this may comprise comparing the read value with a string of binary ones. The write-once logic may prevent an address from being overwritten by blocking any attempt to write to a portion of the address register unless the portion is in an erased state; this portion may be equal to the whole address register, or it may be smaller than the address register—e.g., being a bit or a half-word in length. In some embodiments, the write-once logic may check the state of the address register in half-word portions.

The write-once logic may also prevent a cryptographic key being written to the key register unless the key register is in an erased state. In this way, a manufacturer or distributer or user may write one or more cryptographic keys once during a configuration phase (e.g., by writing the key over the system bus using a secure bootloader, or secure-mode software, executing on the processor, or via a debug or test interface), and thereafter prevent any modifications to the keys. The protection may be applied at the granularity of a bit, a half-word, a word, or any other portion length, as described above, The device may prevent the address register(s) and/or key register(s) from ever being erased. In this case, these registers are effectively one-time programmable for the life of the device. In other embodiments, however, the device may permit erasing of an address or key register. In this case, though, the device preferably comprises erase logic that prevents any address register from being erased unless the key register associated with the address register is also erased (which could mean previously erased, or simultaneously erased with the key register in a common erase operation). The erase logic may require that the entire key storage memory be erased in a single erase operation (i.e., an atomic operation), such that every key is guaranteed to be wiped before any address register can be written to again.

The key bus is preferably connected only to the hardware key-storage system and one or more cryptographic engines. The key bus is preferably inaccessible to any general-purpose processor of the device and/or to a debugger and/or to any peripheral that is not configured to perform a cryptographic operation requiring a cryptographic key.

The key storage memory may comprise a respective configuration register for each cryptographic key. The configuration register may comprise a flag for revoking a key.

The flag may be in a non-revoked state by default, but the key-storage system may be configured to set the flag to a revoked state in response to an instruction—e.g., for the processor. The key-storage system may also be configured to revoke a key on detection of an error. When a key is revoked, the key-storage system is preferably configured to prevent all further access to the key.

It will be appreciated that the logic disclosed herein (output logic, write-once logic, etc.) may be implemented in any appropriate way. It may comprise any number of digital logic gates, transistors, flip-flops, etc. It is preferably purely hardware logic—i.e. does not include any software element, for execution on a general-purpose processor. The logic is preferably separate from the processor.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
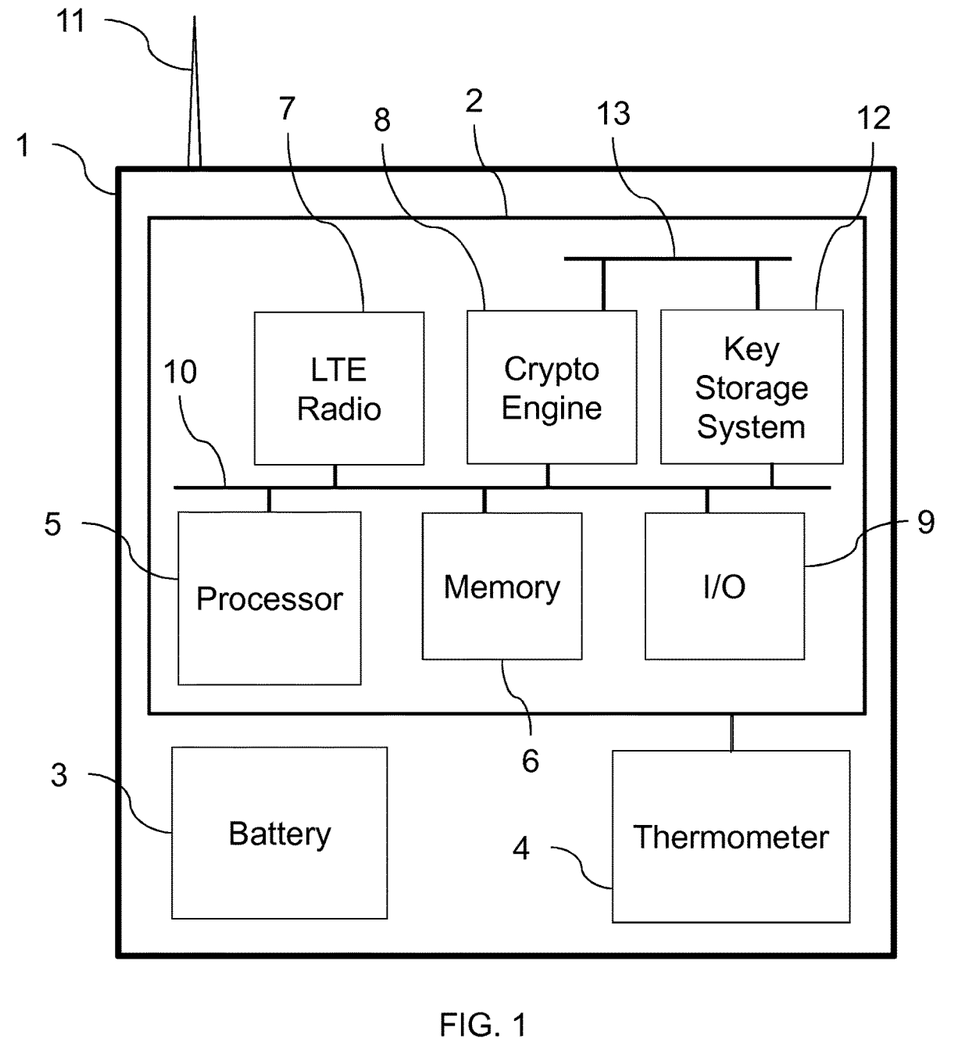
FIG. 1 is a schematic diagram of a wireless temperature sensor having a key management system embodying the invention.

FIG. 1 shows a wireless temperature sensor 1 which contains an integrated-circuit radio chip 2, a battery 3 and a thermometer 4. It will be appreciated that it also contains other familiar, discrete components, such as PCBs, oscillators, capacitors, resistors, a housing, user interface features, etc. which are not shown in FIG. 1 for the sake of simplicity.

The radio chip 2 contains a processor 5, memory 6 (which may include volatile and non-volatile memory types), an LTE Cat-M1 (LTE-M) radio 7, a hardware cryptography engine 8, an input/output peripheral 9, such as a USB interface, and a key storage system 12. These elements are all connected to a bus system 10 which supports direct memory access (DMA) by bus masters other than just the processor 5. The chip 2 support memory-mapped peripheral access.

In this example, the processor 5 is an Arm™ Cortex-M series processor, although it could be any type of processor. The processor 5 can be switched between a Secure mode of operation and a Non-Secure mode of operation.

The bus system 10 may implement the Arm™ Advanced Microcontroller Bus Architecture (AMBA) and may include one or more interconnected buses, such as an Advanced High-Performance Bus (AHB) and an Advanced Peripheral Bus (APB). The sensor 1 also has an antenna 11 which is connected to the LTE-M radio 7 via appropriate off-chip components.

The hardware cryptography engine 8 and the key storage system 12 are additionally connected to each other by a secure memory bus 13 (embodying the key bus disclosed above), which can be used to transfer sensitive data, such as cryptographic keys, securely from the key storage system 12 to the hardware cryptography engine 8, without these keys being visible to the processor 5 or to the other peripherals. The secure memory bus 13 may be an Advanced Peripheral Bus (APB), or a proprietary bus. The key storage system 12 may manage a number of different cryptographic keys for the device.

The memory 6 stores software which is executed by the processor 5 for controlling the operation of the wireless temperature sensor 1. In use, the processor 5 uses the I/O peripheral 9 to fetch temperature readings from the thermometer 4 at intervals, and writes these to the memory 6. The wireless temperature sensor 1 periodically transmits a log of temperature information, by the LTE-M radio 7, to a network base station (not shown), from where it may travel to a destination (e.g., a remote server) on the Internet. The wireless temperature sensor 1 also computes an RFC 2104 keyed-hash message authentication code (HMAC) of the log, based on the SHA-256 algorithm. This HMAC is transmitted along with the log to authenticate and prove the integrity of the log data to the recipient.

A secret key, for computing the H MAC, is stored in the key storage system 12. This secret key may have been loaded into the key storage system 12 by a manufacturer or vendor before the device 1 was sold to the public. Once loaded, the secret key can be sent, by the key storage system 12, to the hardware cryptography engine 8 over the secure bus 13, but cannot be accessed by the processor 5.

The cryptography engine 8 has a key register 15 to which the key storage system 12 can push the secret key, when instructed to do so by the processor 5. The key storage system 12 may be configured to receive instructions from the processor 5 through a register interface accessed over the bus system 10, or any other appropriate mechanism. The key register 15 on the cryptographic engine 8 is not accessible over the bus interconnect 10 and the cryptography engine 8 is designed so as not to reveal the secret key to the processor 5 as it performs the keyed-HMAC operation.

Although the key storage system 12 is shown as a distinct block in FIG. 1, it should be understood that this is a logical representation, rather than a physical representation.

Figure 2:
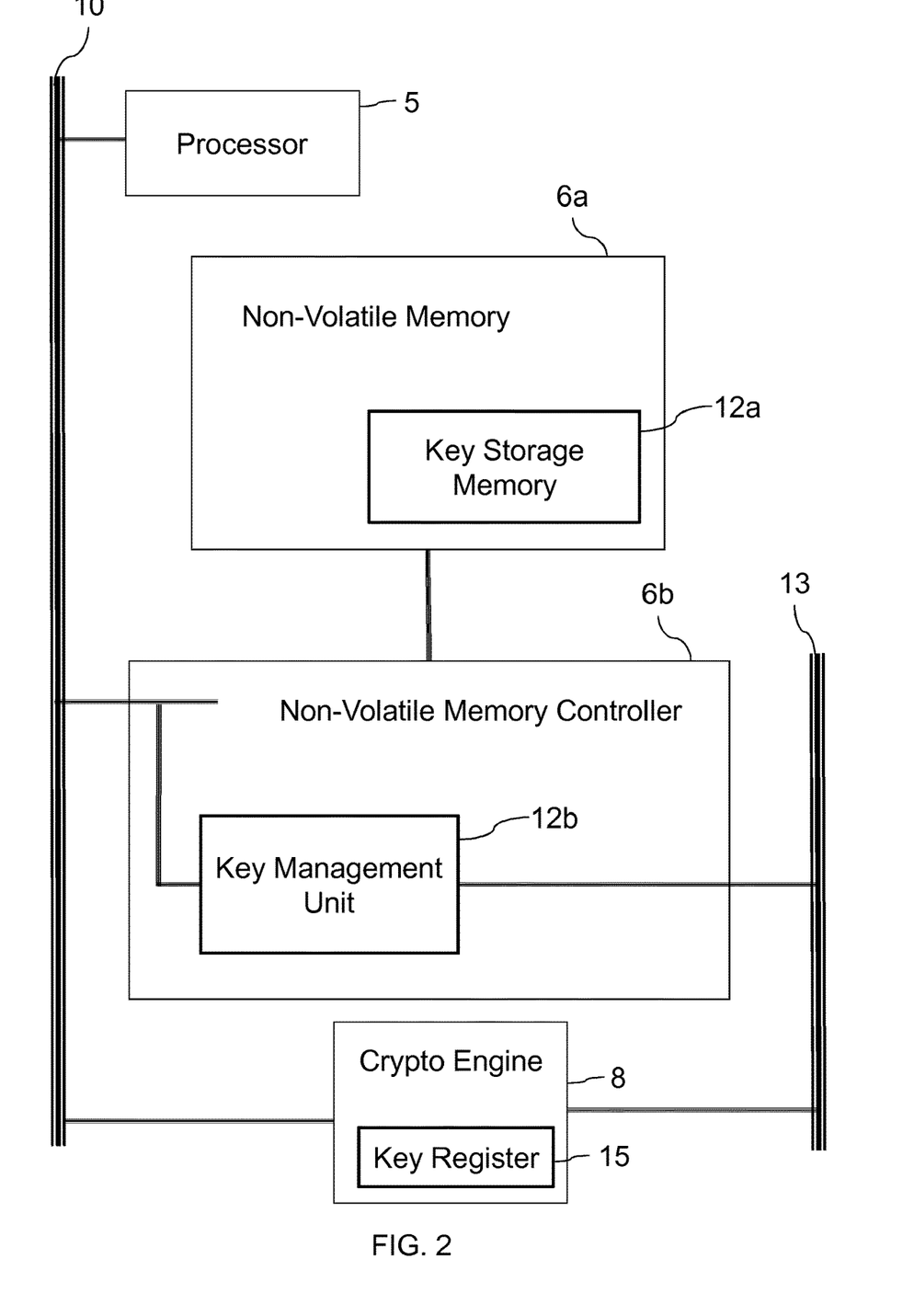
FIG. 2 is a schematic diagram showing the key management system in greater detail.

FIG. 2 shows the key storage system 12 in greater detail, alongside the processor 5 and cryptographic engine 8.

The key storage system 12 comprises a key storage memory 12a, which is a region of non-volatile (e.g., flash) memory 6a within the overall memory 6 of the device 1. The key storage memory 12a may be used for storing device-specific keys and for establishing a device Root-of-Trust (RoT) during chip and OEM manufacturing. It is envisaged that the key storage memory 12a will be used for persistent keys, rather than for short-lived session keys where the processor 5 is involved in the key generation or exchange.

The key storage system 12 also comprises a key management unit 12b which is located within a non-volatile memory controller 6b of the memory 6. Access to, and use of, the key storage memory 12a is controlled by the key management unit 12b such that only authorised reads of addresses in the key storage memory 12a are permitted.

Even though the key storage memory 12a and key management unit 12b are tightly coupled, they do not share a common memory map.

The key management unit 12b is memory-mapped as a stand-alone peripheral on the bus system 10 (e.g., on an APB bus), while the key storage memory 12a is located in the non-volatile memory map and is addressable as such on the bus system 10 (e.g., on an AHB bus). Access to the key management unit 12b and the keys stored in the key storage memory 12a is allowed only by secure accesses. Access to the key storage memory 12a is the same as to any other pages of the non-volatile memory 6a, except that the key management unit 12b will enforce usage and read/write restrictions to different regions of the memory map of the key storage memory 12a, depending on configuration.

Figure 3:
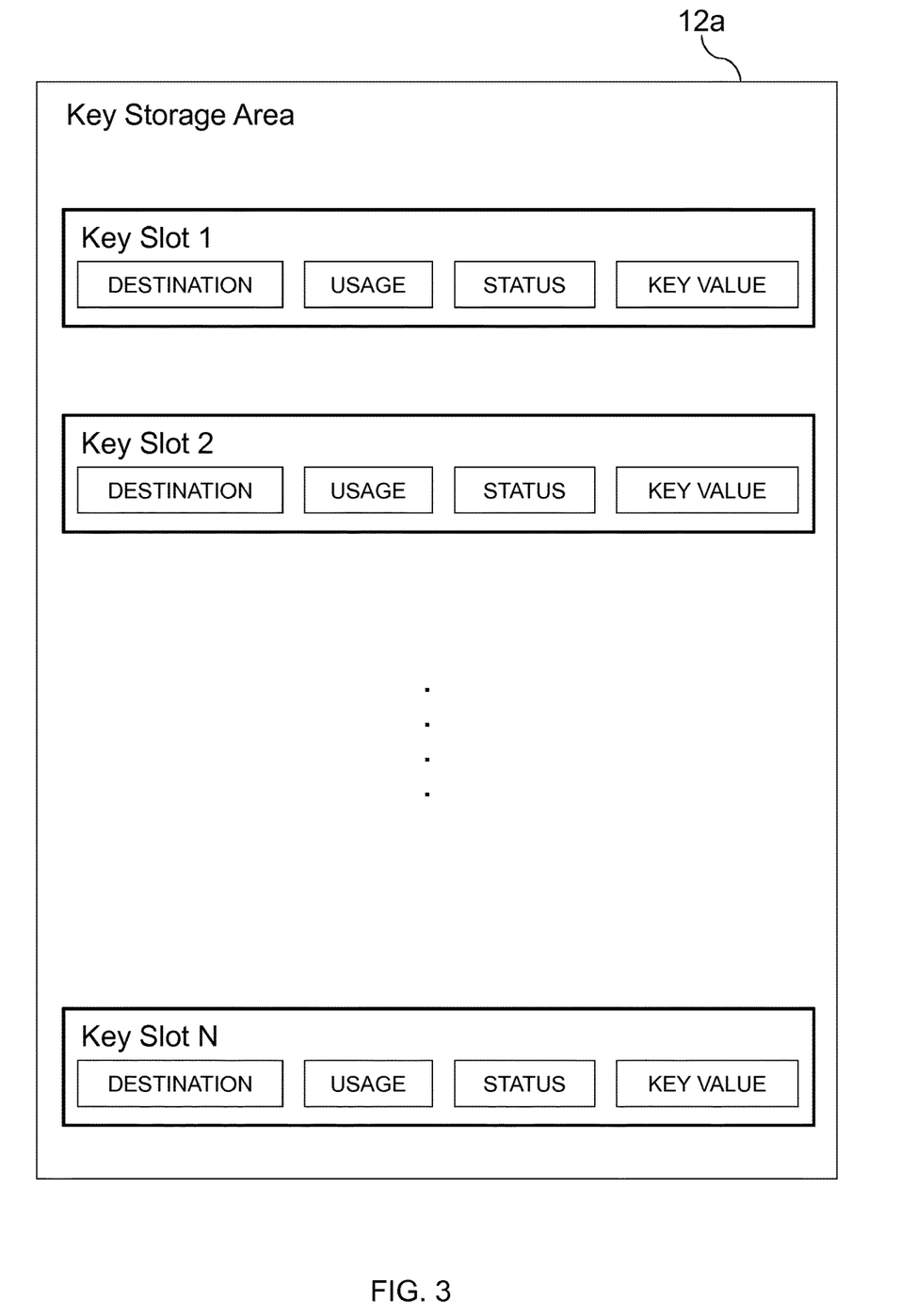
FIG. 3 is a schematic diagram showing the key storage area in greater detail.

FIG. 3 shows how data is arranged in the key storage memory 12a.

The key storage memory 12a contains multiple key slots (e.g., 128 key slots), numbered 1, 2 . . . N. Each slot has a key header (DESTINATION, USAGE, STATUS) and an associated key value (KEY VALUE). Each instance of a key slot follows the same register design pattern, regardless of the type of content the slot contains (e.g., symmetric key, asymmetric key, etc.). In some implementations, the key value is limited in size (e.g., to 128 bits) and any key size greater than the limit must be divided and distributed over multiple key slots. In addition to key values (symmetric keys, public keys, private keys, etc.), a key slot may be used to store a hash value or any other device secret.

The key management unit 12b imposes a one-time-programmable (OTP) behaviour on the whole key storage memory 12a, at the granularity of a half-word (i.e., every 16 bits on a 32-bit architecture). This uses digital logic to block any write to a half-word in the key storage memory 12a if that half-word is not in an erased state (e.g., 1111111111111111'b, for flash memory). This may be implemented by the key management unit 12b reading each half-word and determining if it is in a natural erased state before allowing a write operation to the half-word. In some cases, it may be permitted to erase the entire key storage memory 12a using a block erase operation (e.g., during a firmware upgrade process); in other cases, even an erase may be prevented such that the memory is OTP for the entire life of the device 1.

Thus, once a cryptographic key has been written to a key slot, it cannot be erased (except, possibly, when erasing the entire key storage memory 12a). Instead, a key that is no longer required may be revoked.

Access control to the key storage memory 12a is enforced by a hardware Finite State Machine (FSM) that can allow or block transactions depending both on the security of the transaction (Secure or Non-Secure) and the type of register being written and/or read. Access control can be configured individually for each key slot; the FSM operates on only one key slot at a time, and the read permissions and usage restrictions for the key value associated with the key slot can be set individually.

In the present example, the key storage memory 12a and key management unit 12b are mapped as "secure" peripherals and consequently only accept accesses from the processor 5 when the processor 5 is in secure mode. Any non-secure access attempts by the processor 5 or any other bus master will result in a fault. Any attempt to write to a key slot from a non-secure mode will result in a flag being set in the key slot's STATUS field, effectively revoking the key. This can be useful for debugging purposes during a software development phase.

The key header for each key slot contains a secure destination address, DESTINATION, which should contain a single destination memory address to which the key management unit 12b can copy the key slot's key value, when an authorised request is received by the key management unit 12b. This address may be anywhere on the device 1. However, to maintain maximum security, it is preferably an address that is accessed only over the secure bus 13, rather than the general bus system 10. The destination address is preferably for a memory location that has physical restrictions on the processor 5's ability to access the memory location—e.g., not being accessible at all by the processor 5, or permitting read access by the processor 5 only when the processor 5 is in secure mode. In this way, it is not possible for the processor 5 to gain any access to the key.

In the present example, the DESTINATION field of at least one of the key slots contains the address of the key register 15 in hardware cryptographic engine 8. Note that it is quite possible for multiple key slots to share a common DESTINATION address.

The USAGE field contains a bit field used to store one of the following values: "Restricted", "Always" and "Always—Secure".

The "Restricted" value instructs the key management unit 12b to prevent the associated key value from being read directly from the key storage area 12a (e.g., by the processor 5). The key value can be used only by instructing the key management unit 12b to push it to the destination address.

The "Always" and "Always—Secure" values instruct the key management unit 12b to allow read access directly from the key storage area 12a over the bus system 10. The "Always—Secure" value limits such read access to the processor 5 when the processor 5 is in secure mode.

Setting a key slot to be readable by the processor 5 in secure mode may be useful during a secure boot sequence, where the processor 5 is involved in falsifying or verifying the integrity of the system. Since the processor 5 is involved in the integrity check decision process anyway, it may be reasonable to trust the processor 5 to have access to actual key value. Another use-case for a readable key, for use in a particular cryptographic algorithm, is where the chip 2 does not have a hardware peripheral for receiving the key over the secure bus 10 and using it to perform the cryptographic algorithm; in this case, the processor 5 may be required to perform the algorithm.

The STATUS field records whether a key is "Active" or "Revoked". It may be a single bit field. If the revoked value is written to the STATUS field, this instructs the key management unit 12b not to allow the key value to be read or pushed over the secure bus 13, regardless of all other usage settings. The default state is "Active".

In other embodiments, there may of course be other header fields which may provide for more complex restriction controls.

The key management unit 12b provides a register interface, accessible over the bus system 10, for selecting a key slot (by ID number), and for pushing the key value from a selected key slot to its destination. The interface also provides controls relating to notifications on event lines or interrupt lines for situations such as: the key value has been successfully pushed, the selected key slot is revoked, or some other error (e.g., no key slot selected, or no destination address defined, or an error occurs during the push operation).

Pushing a key slot over the secure bus 13 is thus a three-step process:

1. Select the key slot which the key management unit 12b shall operate on by writing the desired key slot ID into a SELECTKEYSLOT register.

2. Initiate a secure bus 13 transaction by writing to a TASKS_PUSH_KEYSLOT register (or sending a signal to the key management unit 12b over a physical task line—e.g., leading to a programmable peripheral interconnect system as described in the applicant's earlier publication WO 2013/088121, the contents of which are hereby incorporated by reference); this causes the 128 bit key value associated with the selected key slot to be written to the address defined in KEYSLOT[n].DEST—e.g., by means of a 4×32 bit APB transaction over the secure memory bus 13.

3. After the secure bus 13 transaction has completed, the key management unit 12b will issue an EVENTS_KEYSLOT_PUSHED on a physical signal line from the key management unit 12b, or on an interrupt line to the processor 5, to indicate that the 128 bit key value is ready for use.

If a key value is distributed over multiple key slots due to its key size exceeding the maximum 128 bit key value limit, then each distributed key slot must be pushed individually in order to transfer the entire key value over secure bus 13.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An integrated-circuit device comprising:
   a processor;
   a hardware key storage system;
   one or more cryptographic engines;
   a system bus; and
   a key bus, separate from the system bus, wherein the processor is not connected to the key bus;
   wherein the processor and the hardware key-storage system are both connected to the system bus, and the hardware key-storage system is configured to receive instructions from the processor over the system bus;
   wherein the one or more cryptographic engines are connected to the key bus and comprise respective addressable input registers for receiving cryptographic keys over the key bus; and
   wherein the hardware key-storage system comprises:
   a non-volatile key storage memory comprising a key register configured to store a cryptographic key and an address register configured to store a destination memory address for the cryptographic key, the destination memory address being an address of an input register of a cryptographic engine of the one or more cryptographic engines, wherein the hardware key-storage system comprises a key storage memory, wherein the key storage memory comprises the key register and the address register, and further comprises one or more configuration registers for storing configuration data relating to the cryptographic key;
   output circuitry configured to:
   read the cryptographic key from the key register of the non-volatile key storage memory,
   read the destination memory address from the address register of the non volatile key storage memory, and
   use the cryptographic key and the destination memory address to initiate a bus transaction to send the cryptographic key from the hardware key-storage system over the key bus to the input register of the cryptographic engine;
   write-once logic configured to prevent an address being written to the address register unless the address register is in an erased state; and
   first hardware for performing a first cryptographic algorithm, and second hardware for performing a second cryptographic algorithm, the first hardware comprising a first addressable register having a first register address for receiving a first cryptographic key from the key-storage system over the key bus, and the second hardware comprising a second addressable register having a second register address for receiving a second cryptographic key from the key-storage system over the key bus, wherein:
   the key register of the non-volatile key storage memory is configured to store the first cryptographic key and the address register of the non-volatile key storage memory is configured to store the first register address;
   the non-volatile key storage memory comprises a further key register configured to store the second cryptographic key and a further address register configured to store the second register address; and
   the output circuitry is configured to send the first cryptographic key from the hardware key-storage system over the key bus to the first register address, and to send the second cryptographic key from the hardware key-storage system over the key bus to the second register address.

2. The integrated-circuit device of claim 1, having a cryptographic key stored in the key register, and a destination memory address stored in the address register, wherein the destination memory address is an address of a memory location that is never readable by the processor, or that is readable by the processor only when the processor is in a secure mode.

3. The integrated-circuit device of claim 1, comprising a memory storing software for instructing the processor to write a cryptographic key to the key register, and to write a destination memory address to the address register, wherein the destination memory address is an address of a memory location that is never readable by the processor, or that is readable by the processor only when the processor is in a secure mode.

4. The integrated-circuit device of claim 1, wherein the hardware key-storage system comprises read-access logic configured to prevent the processor from reading data from the key register when the processor in a non-secure mode.

5. The integrated-circuit device of claim 1, comprising a non-volatile memory controller for the non-volatile key storage memory, the non-volatile memory controller being connected to a system bus, wherein the non-volatile memory controller comprises a key management unit, the key management unit comprising said write-once logic, wherein the key management unit is configured to intercept all write messages, on the system bus, that address the address register.

6. The integrated-circuit device of claim 1, wherein the write-once logic comprises circuitry for reading part or all of the address register and for determining whether said part or all of the address register is in an erased state.

7. The integrated-circuit device of claim 1, wherein the output circuitry is a bus master for the key bus and is configured to write the cryptographic key to the destination memory address using direct memory access.

8. The integrated-circuit device of claim 1, comprising erase logic configured to prevent the address register from being erased unless the key register is already in an erased state, or is erased in a common erase operation with the address register.

9. The integrated-circuit device of claim 1, comprising a plurality of key registers, for storing a plurality of respective cryptographic keys, and a plurality of respective address registers, for storing a plurality of respective destination memory addresses for the cryptographic keys, wherein the output circuitry is configured for sending each cryptographic key over the key bus to the respective destination memory address.

10. The integrated-circuit device of claim 9, comprising first hardware for performing a first cryptographic algorithm, and second hardware for performing a second cryptographic algorithm, the first hardware and second hardware having different respective register addresses for receiving a respective cryptographic key from the key-storage system, over the key bus.

11. A method of operating an integrated-circuit device, the integrated-circuit device comprising:
a processor;
a hardware key-storage system;
one or more cryptographic engines;
a system bus; and
a key bus, separate from the system bus,
wherein the processor is not connected to the key bus;
wherein the processor and the hardware key-storage system are both connected to the system bus, and the hardware key-storage system is configured to receive instructions from the processor over the system bus;
wherein the one or more cryptographic engines are connected to the key bus and comprise respective addressable input registers for receiving cryptographic keys over the key bus; and
wherein the hardware key-storage system comprises a non-volatile key storage memory comprising a key register that stores a cryptographic key and an address register that stores a destination memory address for the cryptographic key, the destination memory address being an address of an input register of a cryptographic engine of the one or more cryptographic engines,
wherein the hardware key-storage system comprises a key storage memory,
wherein the key storage memory comprises the key register and the address register, and further comprises one or more configuration registers for storing configuration data relating to the cryptographic key;
first hardware for performing a first cryptographic algorithm, and second hardware for performing a second cryptographic algorithm, the first hardware comprising a first addressable register having a first register address for receiving a first cryptographic key from the key-storage system over the key bus, and the second hardware comprising a second addressable register having a second register address for receiving a second cryptographic key from the key-storage system over the key bus, wherein:
the first cryptographic key is stored in the key register of the non-volatile key storage memory;
the first register address is stored in the address register of the non-volatile key storage memory;
the second cryptographic key is stored in a further key register of the non-volatile key storage memory; and
the second register address is stored in a further address register of the non-volatile key storage memory;
the method comprising sending the cryptographic key over the key bus to the input register of the cryptographic engine, by:
reading the cryptographic key from the key register of the non-volatile key storage memory,
reading the destination memory address from the address register of the non-volatile key storage memory, and
using the cryptographic key and the destination memory address to initiate a bus transaction to send the cryptographic key from the hardware key-storage system over the key bus to the input register of the cryptographic engine,
the method further comprising the hardware key-storage system:
receiving an instruction to write a new destination memory address to the address register;
determining that the address register in not in an erased state; and
in response to said determining, preventing the writing of the new destination memory address to the address register;
sending the first cryptographic key from the hardware key-storage system over the key bus to the first register address; and
sending the second cryptographic key from the hardware key-storage system over the key bus to the second register address.

12. The method of claim 11, comprising erase logic: receiving an instruction to erase the address register; and requiring the key register be erased in a common erase operation with the address register, or determining that the key register in not in an erased state and, in response to said determining, preventing erasing of the address register.

13. The method of claim 11, comprising the hardware key-storage system receiving instructions from the processor over the system bus.

14. The method of claim 11, further comprising storing a cryptographic key in the key register, and storing a destination memory address in the address register, wherein the destination memory address is an address of a memory location that is never readable by the processor, or that is readable by the processor only when the processor is in a secure mode.

* * * * *